(12) United States Patent
Mihály et al.

(10) Patent No.: US 9,167,498 B2
(45) Date of Patent: Oct. 20, 2015

(54) CACHING OVER AN INTERFACE BETWEEN A RADIO ACCESS NETWORK AND A CORE NETWORK

(75) Inventors: Attila Mihály, Dunakeszi (HU); Lars Westberg, Enköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 121 days.

(21) Appl. No.: 14/127,358

(22) PCT Filed: Jun. 23, 2011

(86) PCT No.: PCT/EP2011/060570
§ 371 (c)(1),
(2), (4) Date: Dec. 18, 2013

(87) PCT Pub. No.: WO2012/175137
PCT Pub. Date: Dec. 27, 2012

(65) Prior Publication Data
US 2014/0126538 A1 May 8, 2014

(51) Int. Cl.
*H04W 40/04* (2009.01)
*H04W 36/02* (2009.01)
*H04W 40/36* (2009.01)
*H04W 76/02* (2009.01)
*H04W 76/04* (2009.01)
*H04W 76/06* (2009.01)

(52) U.S. Cl.
CPC ............ *H04W 40/04* (2013.01); *H04W 36/023* (2013.01); *H04W 40/36* (2013.01); *H04W 76/022* (2013.01); *H04W 76/041* (2013.01); *H04W 76/062* (2013.01)

(58) Field of Classification Search
None
See application file for complete search history.

(56) References Cited

U.S. PATENT DOCUMENTS

| 2008/0281978 A1* | 11/2008 | Tang et al. ............. 709/232 |
| 2010/0034089 A1 | 2/2010 | Kovvali et al. |
| 2010/0208658 A1 | 8/2010 | Vesterinen |
| 2011/0075557 A1* | 3/2011 | Chowdhury et al. ......... 370/230 |
| 2011/0075675 A1 | 3/2011 | Koodli et al. |
| 2011/0116460 A1 | 5/2011 | Kovvali et al. |
| 2012/0076120 A1* | 3/2012 | Kovvali et al. ............. 370/338 |
| 2012/0282929 A1* | 11/2012 | Persson et al. ............. 455/436 |

OTHER PUBLICATIONS

International Search Report, PCT/EP2011/060570, Mar. 1, 2012.
(Continued)

*Primary Examiner* — Faruk Hamza
*Assistant Examiner* — Cassandra Decker
(74) *Attorney, Agent, or Firm* — Patent Portfolio Builders, PLLC

(57) ABSTRACT

A method is provided which introduces user plane caching over an interface between a first node in a radio access network and a second node in a core network. At the first node: receiving first uplink tunnel parameters relating to the second node, selecting first downlink tunnel parameters relating to the first node, sending the first uplink and downlink tunnel parameters to a cache node designated to the first node, receiving second uplink and downlink tunnel parameters relating to the cache node, and sending the second downlink tunnel parameters to the second node. A first tunnel is established between the first node and the cache node based on the second uplink tunnel parameters and the first downlink tunnel parameters, uplink user plane data is sent to the second node through the first and second tunnels via the cache node, and downlink user plane data is received from the second node.

16 Claims, 12 Drawing Sheets

(56) References Cited

OTHER PUBLICATIONS

Written Opinion of the International Searching Authority, PCT/EP2011/060570, Mar. 1, 2012.
International Preliminary Report on Patentability, PCT/EP2011/060570, Jun. 18, 2013.
3GPP 23.829 V1.0.1 (Mar. 2010); "3$^{rd}$ Generation Partnership Project; Technical Specification Group Services and System Aspects; Local IP Access and Selected IP Traffic Offload (Release 10)", 3GPP Standard; 3GPP 23.829, Mobile Competence Centre; 650, Route des Lucioles; F-06921 Sophia-Antipolis Cedex; France, No. V1.0.1, Mar. 24, 2010; XP050402025, pp. 1-37.
3GPP TR 23.829 V0.4.0 (Jan. 2010); "3$^{rd}$ Generation Partnership Project; Technical Specification Group Services and System Aspects; Local IP Access and Selected IP Traffic Offload (Release 10)", 3GPP Standard; 3GPP 23.829, Mobile Competence Centre; 650, Route des Lucioles; F-06921 Sophia-Antipolis Cedex; France, pp. 1-29.
3GPP TS 23.401 V9.1.0 (Jun. 2009); "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)", 3GPP Standard; Mobile Competence Centre; 650, Route des Lucioles; F-06921 Sophia-Antipolis Cedex; France, pp. 1-234.
3GPP TS 23.401 V9.3.0 (Dec. 2009); "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)", 3GPP Standard; Mobile Competence Centre; 650, Route des Lucioles; F-06921 Sophia-Antipolis Cedex; France, pp. 1-254.
3GPP TS 22.101 V10.1.0 (Dec. 2009); "3$^{rd}$ Generation Partnership Project; Technical Specification Group Services and System Aspects; Service aspects; Service principles (Release 10)", 3GPP Standard; Mobile Competence Centre; 650, Route des Lucioles; F-06921 Sophia-Antipolis Cedex; France, pp. 1-59.

\* cited by examiner

FIG. 3
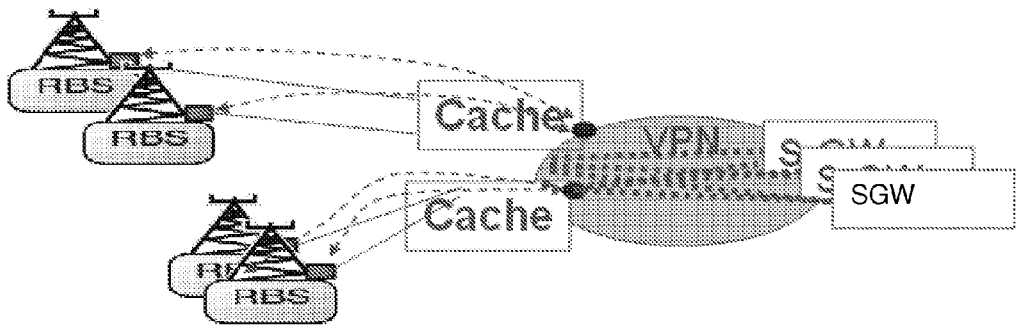
FIG. 4A
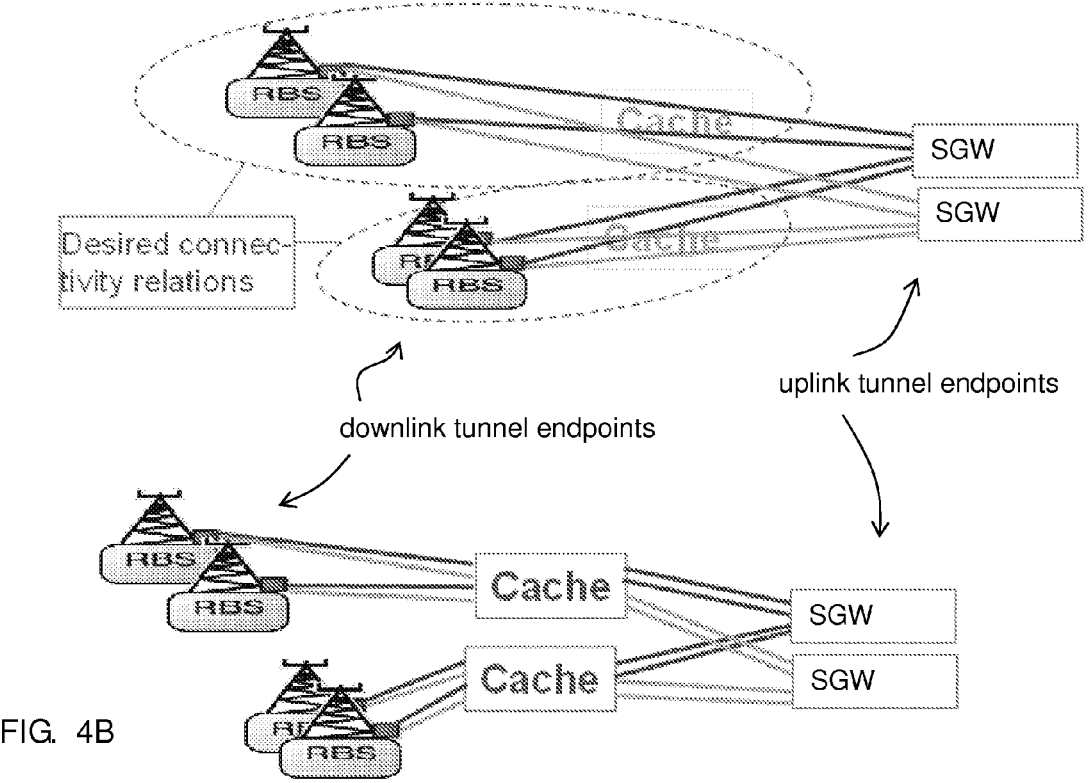
FIG. 4B

| UE ID | Bearer ID | S-IP₁ | TEID-Up$_{S1}$ | R-IP₁ | TEID-Up$_{R1}$ | List of local {sourceIP$_{1x}$; destIP$_{1x}$; sourcePort$_{1x}$; destPort$_{1x}$} | Remote Cache-IP/Tunnel ID | List of remote {sourceIP$_{1x}$; destIP$_{1x}$, sourcePort$_{1x}$; destPort$_{1x}$} |
|---|---|---|---|---|---|---|---|---|
| | | S-IP₁ | TEID-Dn$_{S1}$ | R-IP₁ | TEID-Dn$_{R1}$ | | | |
| ... | | ... | ... | ... | ... | | | |

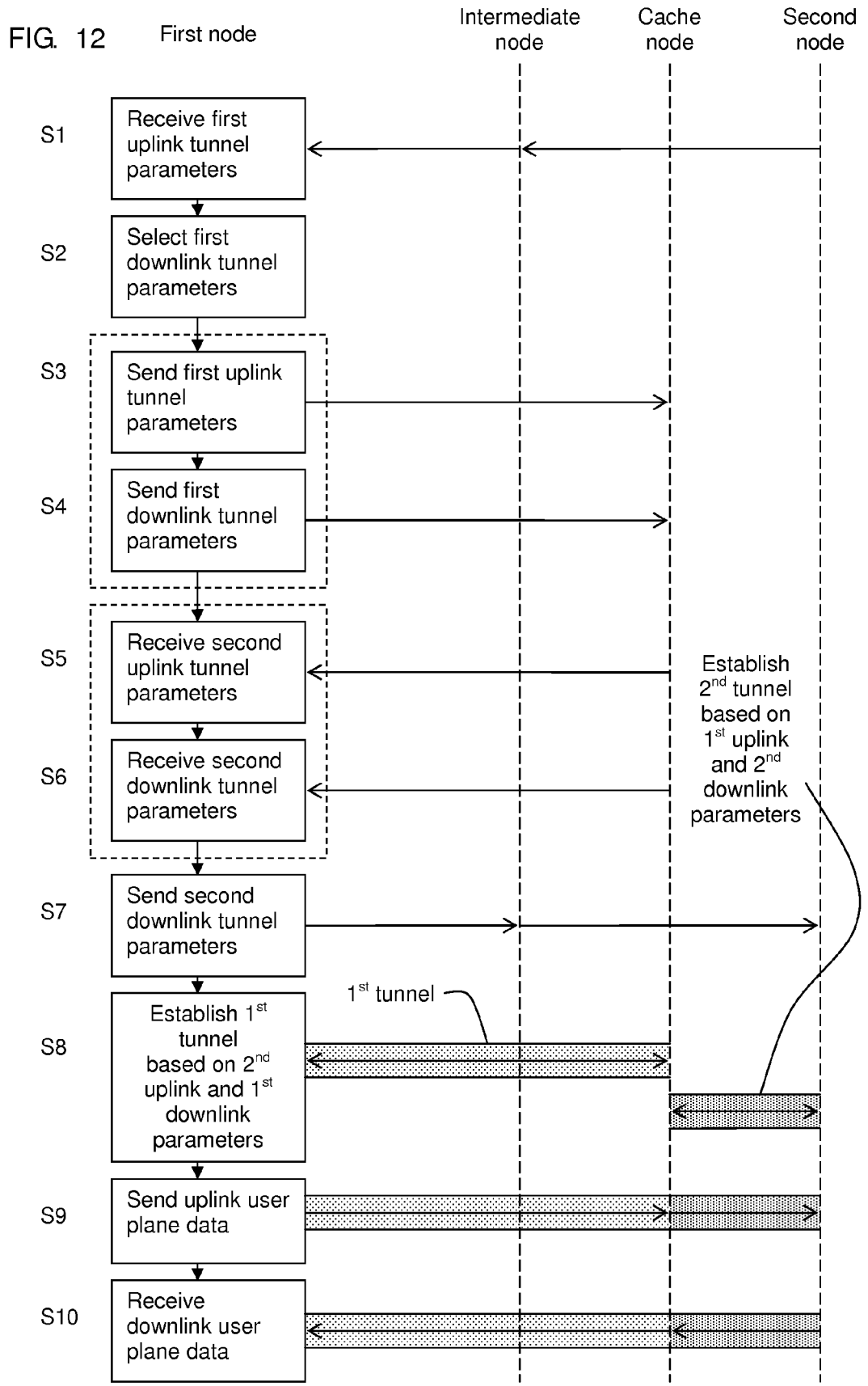

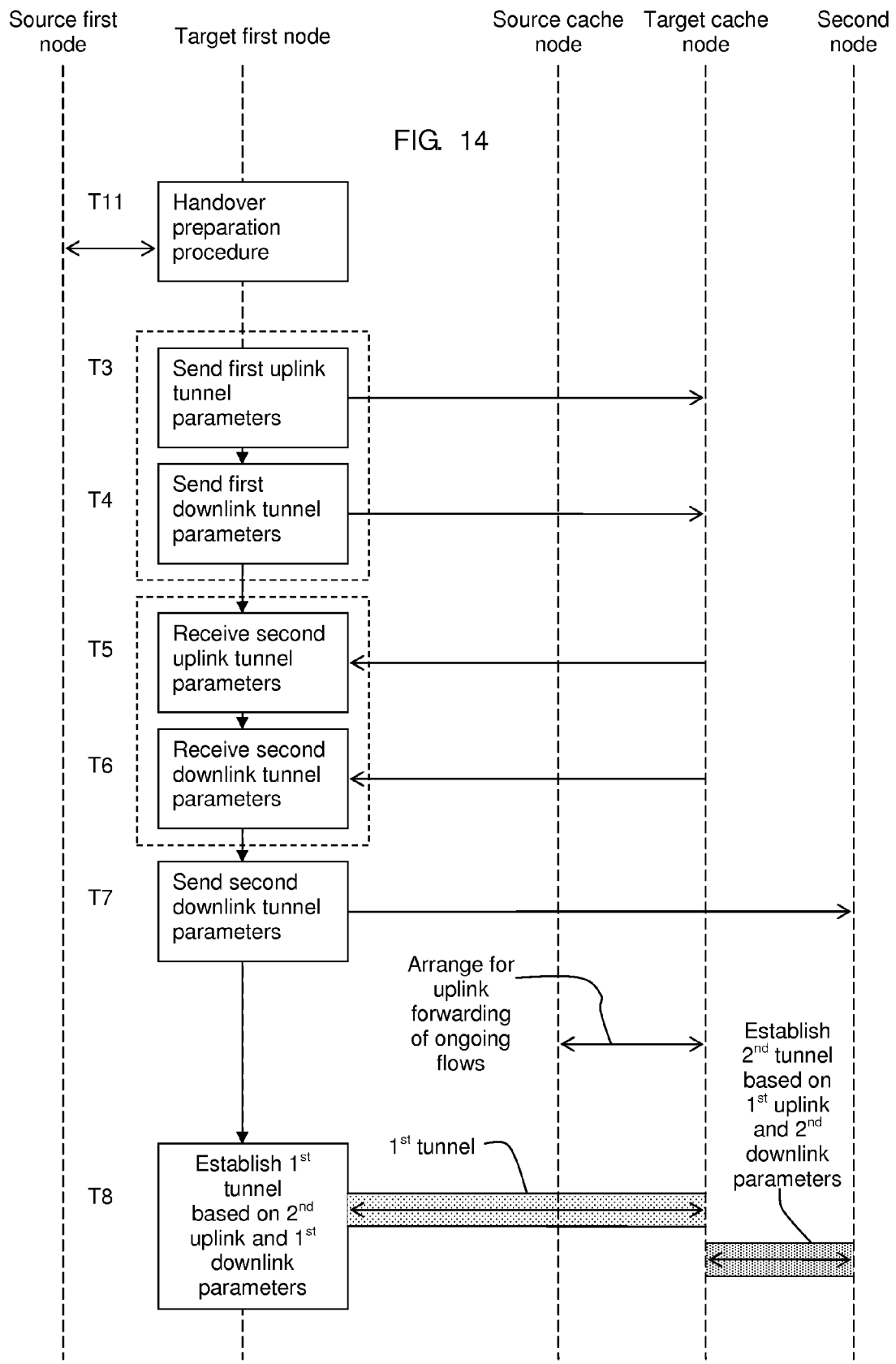

CACHING OVER AN INTERFACE BETWEEN A RADIO ACCESS NETWORK AND A CORE NETWORK

CROSS REFERENCE TO RELATED APPLICATION

This application is a 35 U.S.C. §371 national stage application of PCT International Application No. PCT/EP2011/060570, filed on 23 Jun. 2011, the disclosure and content of which is incorporated by reference herein in its entirety. The above-referenced PCT International Application was published in the English language as International Publication No. WO 2012/175137 A1 on 27 Dec. 2012.

TECHNICAL FIELD

The present invention relates to a method of and apparatus for introducing user plane caching over an interface between a first node in a radio access network and a second node in a core network. In particular, but not exclusively, the present invention relates to a 3rd Generation Partnership Project (3GPP) access network and to caching on such an access network.

BACKGROUND

FIG. 1 of the accompanying drawings is a simplified illustration of the 3GPP network architecture. The Figure is derived from 3GPP TS 23.401 V9.1.0 (2009-06), General Packet Radio Service (GPRS) enhancements for Evolved Universal Terrestrial Radio Access Network (E-UTRAN) access (Release 9). Unless otherwise stated, further references herein to "the standard" relate to TS 23.401, and unless otherwise stated any references herein to TS 23.401 relate to the above version of the standard.

In 3GPP networks, user packets travel through a significant portion of the access network encapsulated in a GTP-U tunnel. The GPRS Tunnelling Protocol (GTP) header of the incoming packet, especially one of its field, the Tunnel Endpoint Identifier (TEID) is used in combination with the tunnel endpoint's IP address to explicitly identify the bearer of the User Equipment (UE).

In SAE/LTE, the Serving Gateway (SGW) and the base station uses the TEID in the received packet's GTP header to forward the packet to the appropriate bearer. Based on the incoming TEID, the SGW selects a GTP or Proxy Mobile IP (PMIP) based tunnel leading to the Packet Data Network (PDN) Gateway (PGW). Based on the incoming TEID, the Evolved NodeB (eNodeB) selects the appropriate radio bearer (leading to a specific UE). There are two alternative tunneling possibilities between the SGW and PGW, one is GTP tunneling similarly as between the Radio Base Station (RBS) and SGW and the other is using PMIP with Generic Routing Encapsulation (GRE) tunneling. (The latter is also based on per-UE tunnels, where the identifiers are different but the concept proposed here works similarly also in this case, so in the following we do not deal with PMIP tunnels).

In 3G networks, GTP is used between the Serving GPRS Support Node (SGSN) and the Radio Network Controller (RNC) as well as the SGSN and Gateway GPRS Support Node (GGSN). Based on the incoming TEID, the SGSN selects a GTP tunnel leading to the GGSN. Based on the incoming TEID, the RNC selects the appropriate radio bearer (leading to a specific UE through the appropriate NodeB). In converged 3GPP networks the traffic from 2G/3G access and SGW is also transported in GTP tunnels.

Lately, with the introduction of broadband mobile technologies and change of subscriber behaviour (shifting towards more high volume media download), coping with the increased traffic volume in the mobile radio access (RAN) has become a stringent problem. One possibility to off-load the access is to apply caches (or other local streaming servers) that would serve some parts of the requested content (media, web, etc). In this way, it is possible to achieve transport gain above the cache. Additional benefits of RAN caching is the possibility for QoS/QoE enhancement by reducing the transport delays and also reduced peering cost.

The reader is also referred to 3GPP TS 22.101 10.1.0 (2009-12), Service aspects; Service principles (Release 10), Section 4.3.5.

The present applicant has identified the following issues.

Below the cache there is no transport gain. Besides, transport cost is highest and transport bottleneck problems arise at low-RAN. Thus, the applicant has appreciated that it would be most advisable to move the caches and streaming servers as close to the RBSes as possible.

A standard architecture has not been developed for caching in the 3GPP RAN close to the RBS. One relevant activity is the offload architectures for selected traffic (e.g. Internet) towards a defined IP network close to the UE's point of attachment to the access network (see TS 23.401). The motivation for this requirement (together with the similar requirement for local IP access (LIPA) for the home (e)NodeB subsystem) is to decrease operator expenses, because in many cases it would be suboptimal to carry the traffic all way up to a central PGW, especially if that traffic may be offloaded locally at lower price to a local service network or to the Internet.

The technical solutions for achieving the selected IP traffic offload (SIPTO) have not been fully worked out yet, but technical alternatives are under discussion as set out in 3GPP TR 23.829 V0.4.0 (2010-01), Local IP Access and Selected IP Traffic Offload (Release 10). It has been decided that for Release 10 two main alternatives will be supported by the standard:

One based on selection of a closer PDN GW for specific types of traffic and

Another based on traffic breakout from the GTP tunnels.

The advantage of the first alternative is that traffic break-out (including break-out for caching purposes) may be achieved by architectural solutions that do not require significant changes to the current 3GPP architecture (the Gateway (GW) address for the closer GW is either suggested by the RAN node or is selected by enhanced DNS-based mechanisms). However, it is not obvious that designing small nodes with PDN GW functionality is economically feasible. Also, it may be a problem to provide secure network environment for these distributed GWs, whose functions (legal intercept, charging, policy enforcement) require such an environment.

Solutions for the latter method generally involve some kind of Network Address Translation (NAT) to be able to offload traffic from a tunnel below the IP point of presence.

Any type of caching solution involving traffic break-out from the GTP tunnels has to deal with the issue of getting the proper tunnel information for a given traffic flow. On one hand this includes receiving the information about new tunnels during attach, but also updating the tunnel information when this changes, e.g. during handovers, when the tunnel endpoints change. One straightforward solution for this problem is to interface to certain core network nodes (Mobility Management Entity—MME, SGW) to get the required information.

However, in practice the mobile operators purchase the core and RAN nodes through different tenders, thus it may happen that one vendor ships the RAN solutions while another vendor ships the Core Network (CN) solution. In such cases, proprietary interface to a CN node is not an option, so other methods are needed to handle tunnel information update that involves intercepting mobility signalling messages, or interfacing to RAN nodes.

A known caching solution (see US 2010/0034089) is based on a cache acting as a proxy both in the user and control plane, i.e., the cache emulates the respective protocols on either side of the interception point. The patent describes in details how the cache monitors the RANAP protocols to get user and bearer information for the case of a cache inserted between the RNC and SGSN in a 3G network. Mobility handling is also described for this case, based on intercepting the relocation request from the RNCs. However, this solution cannot be generalized for the LTE access unless some communication with some core network nodes (SGW or MME) is assumed.

Another issue when interfacing to RAN nodes only is to ensure that the cache is always 'on-path', i.e. the data traffic with subscriber requests reaches the cache. One solution to this that does not require any new function from the cache or mobile network side is to guarantee with proper transport network configuration that traffic from a set of downlink tunnel endpoints and a set of uplink tunnel endpoints goes through the same cache entity. In this respect, the phrase "downlink tunnel endpoint" is used herein to denote the endpoint (or head end) of a tunnel in a downlink direction towards the mobile node; for example the downlink tunnel may be from a core network node such as a SGW to a RBS, with the RBS in this case being the "downlink tunnel endpoint". Similarly, the phrase "uplink tunnel endpoint" is used herein to denote the endpoint (or head end) of a tunnel in an uplink direction away from the mobile node; for example the uplink tunnel may be from the RBS to a core network node such as a SGW, with core network node such as the SGW in this case being the "uplink tunnel endpoint".

A few alternative solutions to this issue exist:
  Routing configuration, i.e. use IGP or BGP routing settings that guarantee that the traffic to and from a set of RBSes will pass a certain traffic redirect/cache entity. One example is shown in FIG. 2 of the accompanying drawings, where it is assumed that each cache is configured as a single OSPF area border router for a group of RBSes.
  Policy-based routing, i.e. use special routing configuration in the network routers that ensures that traffic from and to a set of downlink tunnel endpoints will be routed through a selected cache entity.
  Virtual Private Network (VPN)-based connectivity, i.e. use using some VPN-type of solutions between the cache and the upper tunnel endpoints, see FIG. 3 of the accompanying drawings, that makes it possible that the downlink tunnel endpoint addresses are advertised through the cache. This assumes that some tunnel between a group of downlink tunnel endpoints and the cache is pre-configured.

A common problem of these solutions is that it may be very cumbersome to reconfigure the current transport and routing infrastructure in a real network environment to get the proper transport configuration. Also, basic operation and maintenance use cases (adding or removing nodes) may imply a full transport network reconfiguration.

Another problem arising is that since none of the RAN nodes is a mobility anchor, it may happen during mobility that the data path of a given terminal changes in a way that it will no longer reach neither the cache nor the RAN nodes the cache is interfacing with. This will require a database to store information about where to forward the packets of ongoing flows. The configuration of connectivity to such a database from any cache in the system may be cumbersome, too.

It is desirable to address the issues described above.

SUMMARY

A method is disclosed herein of introducing user plane caching over an interface between a first node in a radio access network and a second node in a core network. The first node receives first uplink tunnel parameters relating to the second node. The first node selects first downlink tunnel parameters relating to the first node. The first node sends the first uplink and downlink tunnel parameters to a cache node designated to the first node. The first node receives second uplink and downlink tunnel parameters relating to the cache node. The first node sends the second downlink tunnel parameters to the second node. This enables establishment of a second tunnel between the cache node and the second node based on the first uplink tunnel parameters and the second downlink tunnel parameters. The first node establishes a first tunnel between the first node and the cache node based on the second uplink tunnel parameters and the first downlink tunnel parameters. The first node sends uplink user plane data to the second node through the first and second tunnels via the cache node. The first node receives downlink user plane data from the second node through the second and first tunnels via the cache node. This enables user plane data between the first and second nodes to be cached at the cache node.

An apparatus is disclosed herein for introducing user plane caching over an interface between a first node in a radio access network and a second node in a core network. The apparatus is for use in the first node. The apparatus comprises means (or a component or processor or unit) for receiving first uplink tunnel parameters relating to the second node. The apparatus comprises means (or a component or processor or unit) for selecting first downlink tunnel parameters relating to the first node. The apparatus comprises means (or a component or processor or unit) for sending the first uplink and downlink tunnel parameters to a cache node designated to the first node. The apparatus comprises means (or a component or processor or unit) for receiving second uplink and downlink tunnel parameters relating to the cache node. The apparatus comprises means (or a component or processor or unit) for sending the second downlink tunnel parameters to the second node. These enable establishment of a second tunnel between the cache node and the second node based on the first uplink tunnel parameters and the second downlink tunnel parameters. The apparatus comprises means (or a component or processor or unit) for establishing a first tunnel between the first node and the cache node based on the second uplink tunnel parameters and the first downlink tunnel parameters. The apparatus comprises means (or a component or processor or unit) for sending uplink user plane data to the second node through the first and second tunnels via the cache node. The apparatus comprises means (or a component or processor or unit) for receiving downlink user plane data from the second node through the second and first tunnels via the cache node. These enable user plane data between the first and second nodes to be cached at the cache node.

The tunnel parameters may comprise an IP address and a tunnel endpoint identifier.

The method may comprise sending, and the apparatus may comprise means for sending, a user terminal identity and bearer identity associated with the user plane with the first uplink and downlink tunnel parameters sent to the cache node.

The method may comprise receiving, and the apparatus may comprise means for receiving, the first uplink tunnel parameters from the second node via an intermediate node and sending the second downlink tunnel parameters to the second node via the or another intermediate node.

The method may comprise receiving, and the apparatus may comprise means for receiving, the first uplink tunnel parameters from the second node in a context or bearer setup request, and sending the second downlink tunnel parameters to the second node in a context or bearer setup response.

The method may comprise receiving, and the apparatus may comprise means for receiving, the first uplink tunnel parameters from the second node.

The method may comprise receiving, and the apparatus may comprise means for receiving, the second uplink and downlink tunnel parameters from the cache node.

The cache node may be designated to a plurality of such first nodes.

The cache node may be located in the radio access network.

A method is disclosed herein of handing over an existing connection, established using the above-described method, from a source first node to a target first node, where a source cache node is designated to the source first node and a target cache node is designated to the target first node, the source cache node being the same as or different to the target cache node. The handover method comprises, at the target first node and following a handover preparation process involving the source first node and the target first node: sending the first uplink parameters for the existing connection and first downlink parameters relating to the target first node to the target cache node, receiving second uplink and downlink parameters relating to the target cache node from the target cache node, and establishing a first tunnel between the target first node and the target cache based on the second uplink tunnel parameters and the first downlink tunnel parameters, the first tunnel being for ongoing and new data flows between the first and second nodes over the handed-over connection. Apparatus is also disclosed comprising means (or a component or processor or unit or plurality of such components or processors or units) for performing such a method.

The method may comprise sending the second downlink tunnel parameters from the target first node to the second node, and establishing or at least thereby enabling establishment of a second tunnel between the target cache node and the second node based on the first uplink tunnel parameters and the second downlink tunnel parameters, the second tunnel being at least for new data flows between the first and second nodes over the handed-over connection.

The method may comprise, at the target cache node and if the target cache node is different to the source cache node, communicating with the source cache node to determine whether there are any ongoing data flows between the first and second nodes over the connection, and if so then arranging for those ongoing flows to be uplink forwarded from the target cache node to the second node via the source cache node.

The above-described first node may be or comprise an eNodeB, RBS, RNC or SGSN.

The above-described second node may be or comprise a SGW or SGSN.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

BRIEF DESCRIPTION OF THE DRAWINGS

FIG. 3 illustrates an arrangement for ensuring connectivity to the cache via VPN;

FIGS. 4A and 4B provide an illustration of terminating the tunnels in the cache;

FIG. 12 is a flowchart illustrating schematically the steps performed according to an embodiment of the present invention;

FIG. 14 is a flowchart illustrating schematically the steps performed in a handover procedure according to an embodiment of the present invention.

DETAILED DESCRIPTION

Referring to the above-described issues with known techniques, an embodiment of the present invention proposes a solution to the connectivity problem by breaking the initial GTP tunnels, between a set of downlink tunnel endpoints (e.g. RBSs) and a set of uplink tunnel endpoints (e.g. SGWs), arranging for a cache to terminate the tunnels from the downlink tunnel endpoints, and then setting up new GTP tunnels from the cache to the corresponding uplink tunnel endpoints. This is illustrated in FIGS. 4A and 4B. FIG. 4A shows the original GTP tunnel setups from the RBSes, with dashed circles showing the desired RBS-Cache connectivity relations (there are no caches present; the faint "cache" wording is merely to illustrate where the caches will end up). FIG. 4B shows each of two caches inserted as a tunnel endpoint for a different corresponding respective group of RBSes.

This is achieved via a control interface between the cache and the RAN nodes. Each downlink tunnel endpoint connects to a single cache on the control plane, and connects to the same cache on the user plane. Note that FIGS. 4A and 4B show only RBSes as downlink tunnel endpoints, but in general case these nodes may also be RNCs, or SGSNs. Similarly, the uplink tunnel endpoint nodes (illustrated as SGWs) may also be SGSNs.

In the following a detailed functionality description of the most important components is given.

As can be seen from FIGS. 4A and 4B, each original uplink and downlink tunnel is in effect duplicated: the cache becomes the tunnel destination and there is another tunnel from the cache connecting to the original tunnel endpoint. The cache is enforced as the tunnel endpoint. Since the architecture assumes standard 3rd party nodes at the tunnel upper end (SGW), this setup can be achieved in an SGW agnostic way. This is possible in the following manner.

Figure 1:
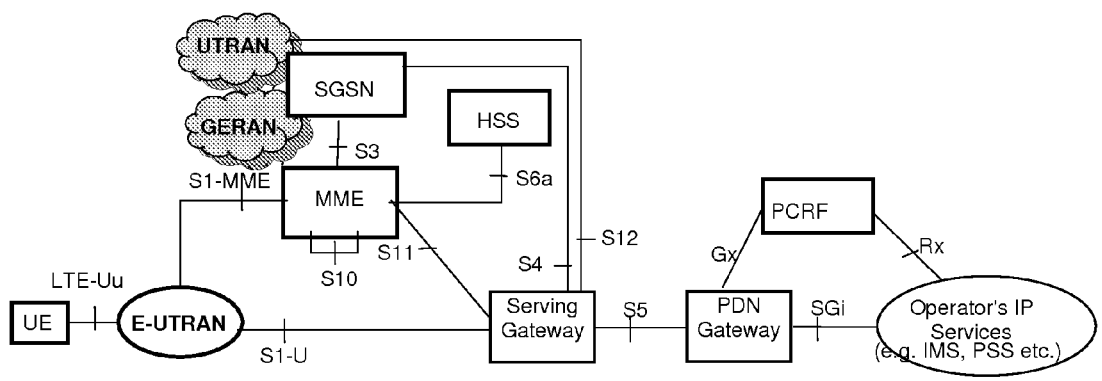
FIG. 1 illustrates a non-roaming architecture for 3GPP access.
Figure 2:
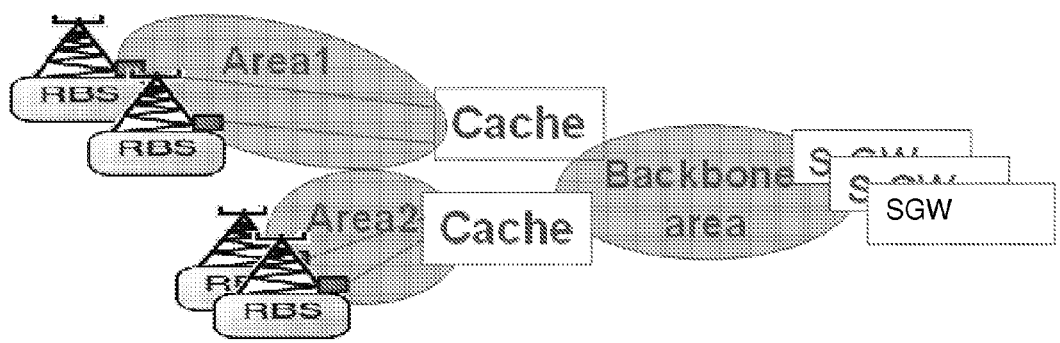
FIG. 2 illustrates an arrangement for ensuring connectivity to the cache with OSPF configuration.
Figure 5:
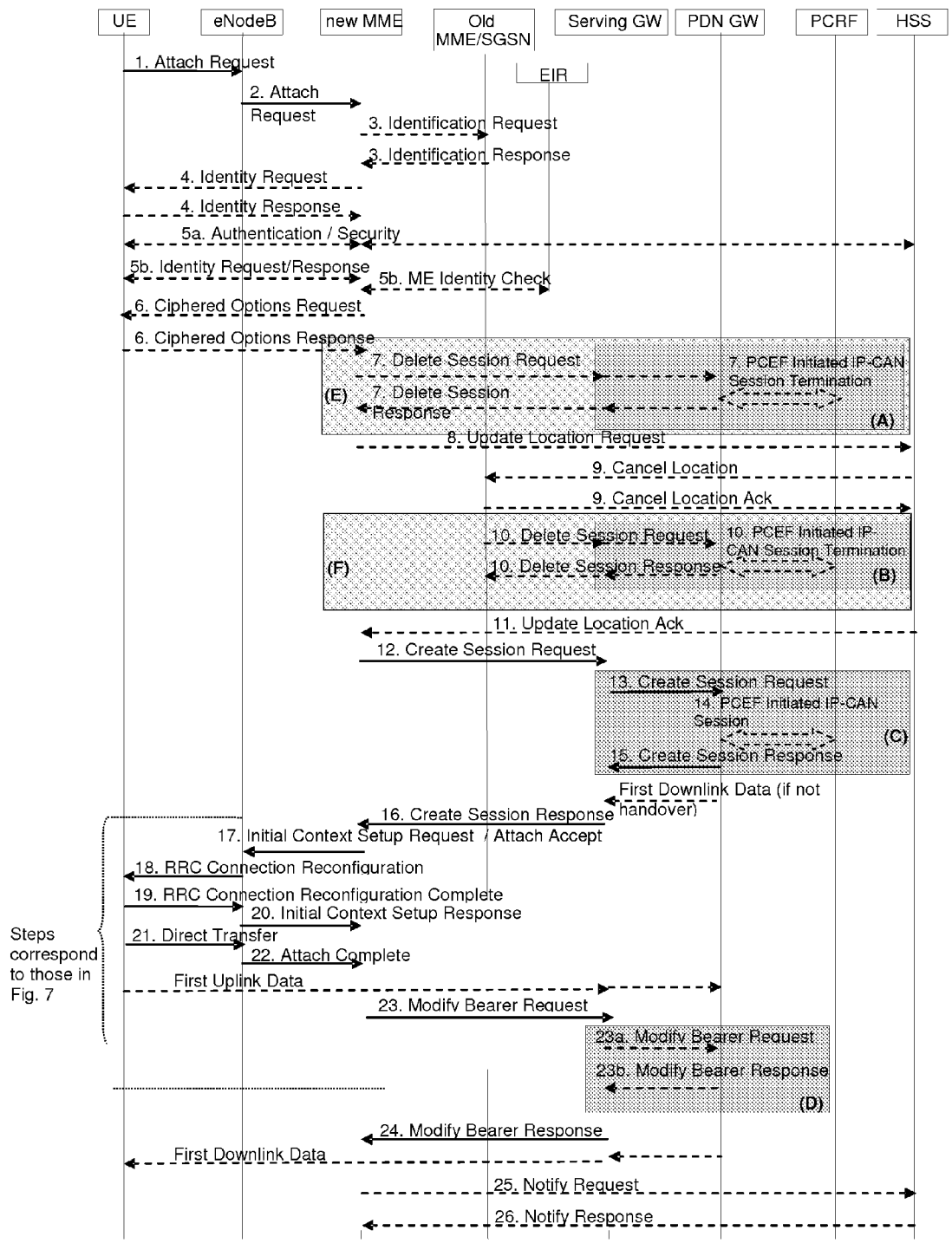
FIG. 5 illustrates an attach procedure according to TS 23.401.

A standard attach procedure is described in TS 23.401, and reproduced in FIG. 5 of the accompanying drawings. During this procedure, the tunnel identifiers for the given bearer are exchanged between the different entities in the following way:

The SGW returns (among others) in the Create Session Response message (message 16 in FIG. 5) the IP address and TEID of the tunnel to be used in uplink direction by the RBS This information is conveyed by the MME to the RBS in an Initial Context Setup message (17 in FIG. 5)

In turn, the RBS will answer with the IP address and TEID to be used for the downlink traffic (Initial Context Setup response, 20 in FIG. 5)

This will be conveyed to the SGW by the MME in the Modify Bearer Request message (23 in FIG. 5)

Figure 6:
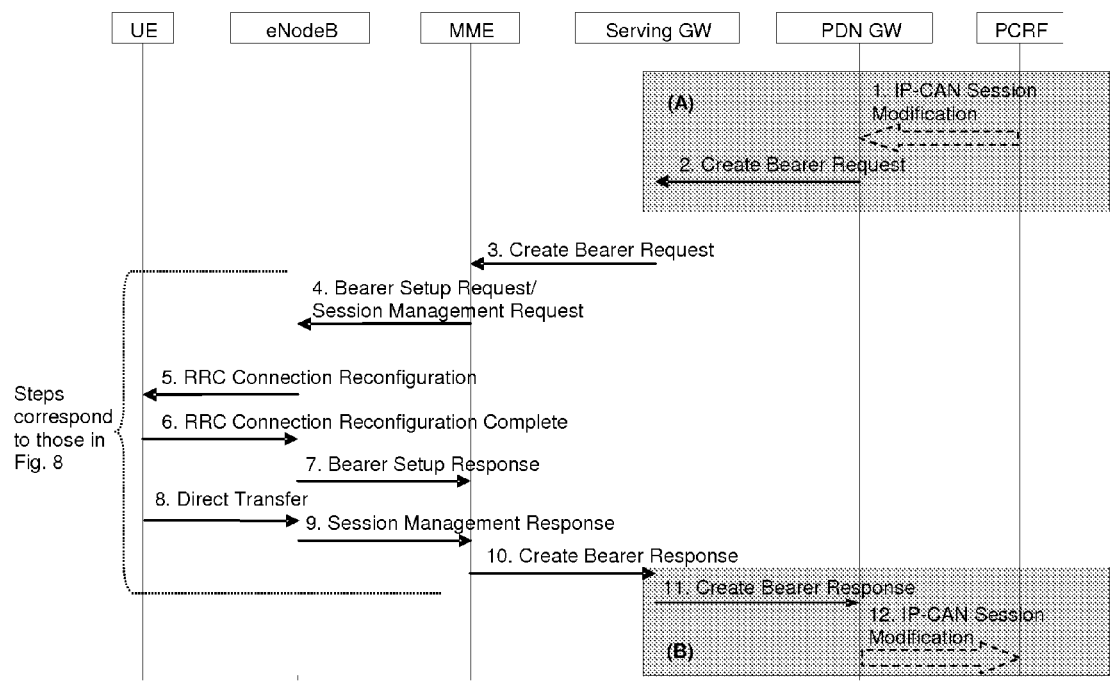
FIG. 6 illustrates a dedicated bearer activation procedure according to TS 23.401.

The tunnel information exchange happens very similarly also during the dedicated bearer activation procedure (see FIG. 6):

The uplink tunnel identifiers are transferred by the SGW with the Create Bearer Request message (3) and then by the MME through the Bearer Setup Request (4)

Figure 7:
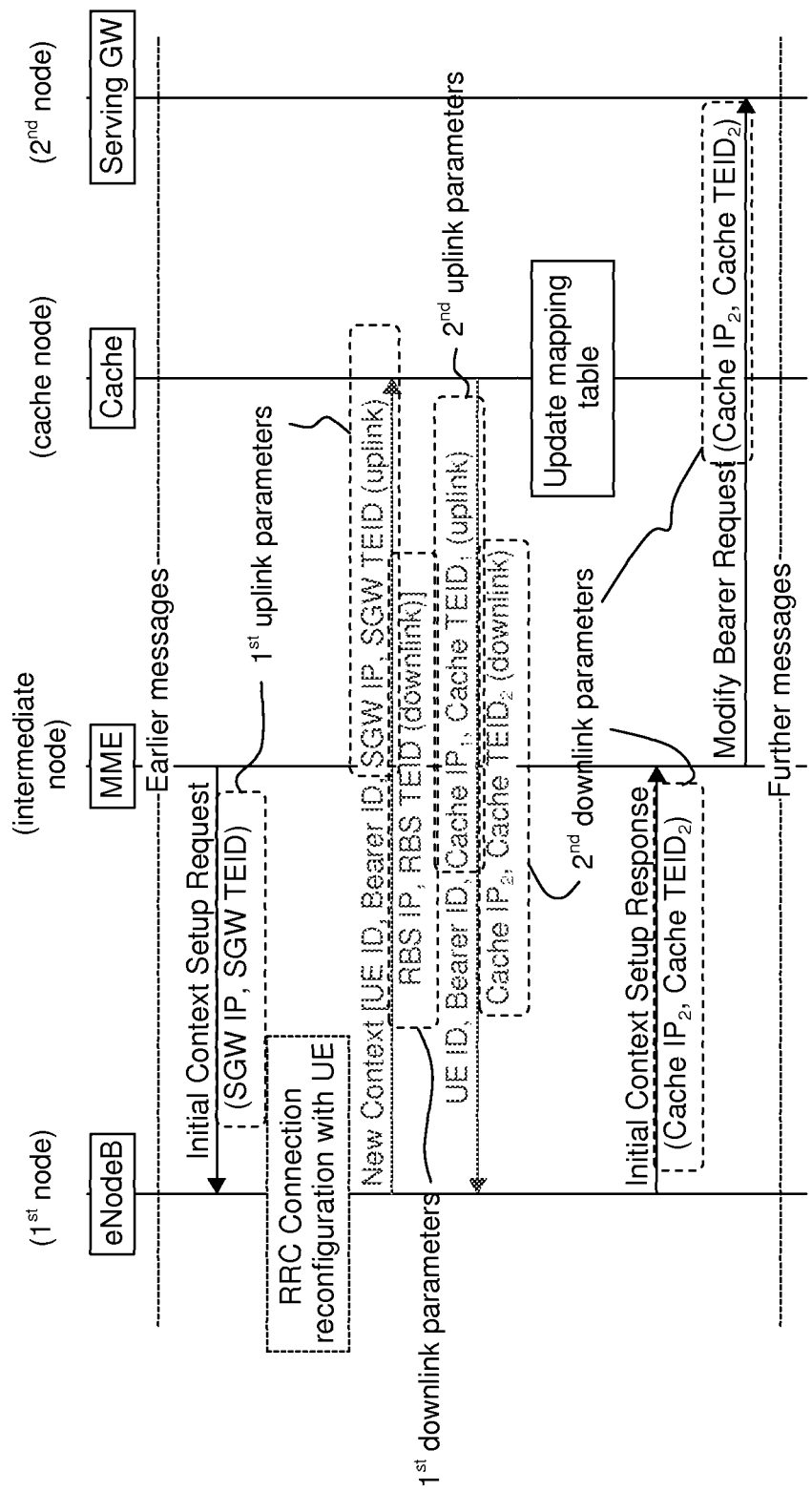
FIG. 7 illustrates the exchange of tunnel information between an RBS (eNodeB) and a cache during a UE attach procedure according to an embodiment of the present invention.

The downlink tunnel identifiers are transferred by the RBS through the Bearer Setup Response message (7) and conveyed to the SGW from the MME via the Create Bearer response Message The main idea of inserting the cache as an intermediate tunnel endpoint is to convey address and tunnel information during the above standard signalling that will indicate the cache as tunnel endpoint from both ends. This is achieved by defining an interface between the Cache and each RBS from the group which is designed to connect to a given cache. Then, the RBSes will exchange the required tunnel information with the cache. In the case of terminal attach this procedure is shown in FIG. 7. After the eNodeB receives the uplink tunnel parameters to use on the S1 interface, it selects the downlink tunnel parameters to use, and it signals these parameters to the cache together with the UE and bearer identity. The cache will use these for the uplink tunnel, and in turn will transmit to the RBS the IP addresses and tunnel endpoints it selected for the uplink tunnel from the RBS (Cache $IP_1$, Cache $TEID_1$) and downlink tunnel from the SGW (Cache $IP_2$, Cache $TEID_2$), respectively. Note that the latter is needed in order to avoid possible overlap of TEIDs from different RBSes in the same cache. Finally, the RBS will send to the MME.

Figure 8:
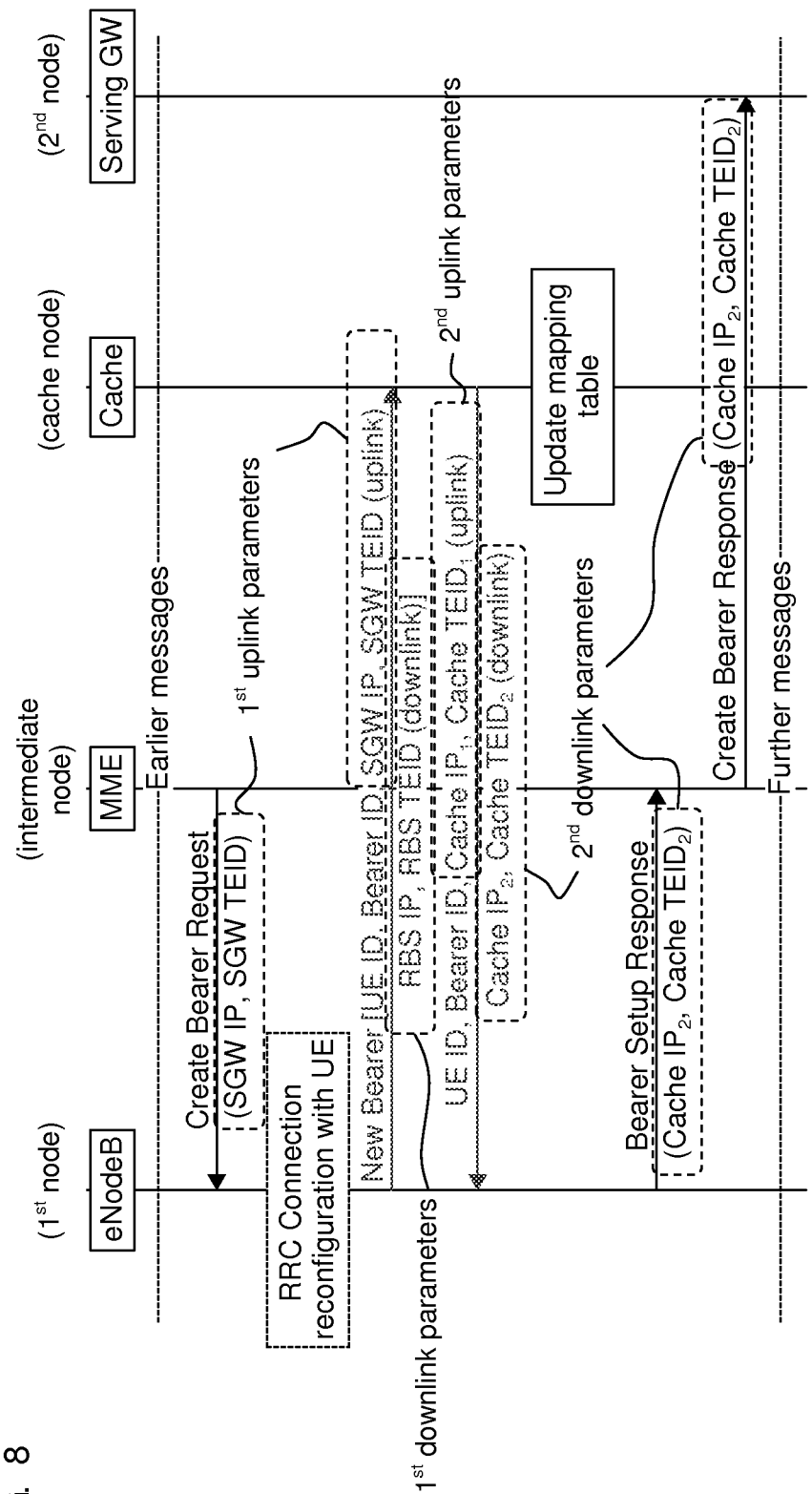
FIG. 8 illustrates the exchange of tunnel information between an RBS (eNodeB) and a cache during a bearer activation procedure according to an embodiment of the present invention.

In the case of new bearer activation, the process is very similar, as shown in FIG. 8. Evidently, the reverse processes of detach or bearer update as well as bearer deactivation should also be supported in order that the cache be able to modify or remove the corresponding entries from its mapping database. Also note that if legacy 2G or 3G networks are connected then the corresponding PDP contexts may be inferred in a similar way by interfacing with the RNC or SGSN.

Traffic arriving at the cache is decapsulated first since the cache is the tunnel endpoint. Therefore, it is more straightforward to redirect these packets to the local and remote cache application since special packet insert functions are not needed.

Figures 11, 15:
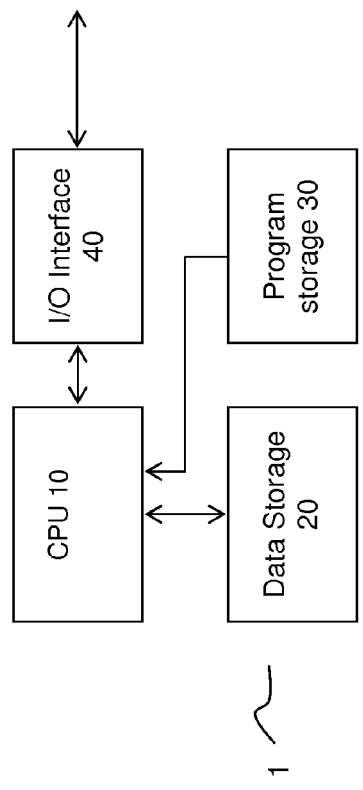
FIG. 11 shows a table relating to a local database for traffic redirect.
FIG. 15 is a schematic illustration of a node in which a method embodying the present invention can be implemented.

The local mapping database for the proposed architectures looks as shown in the table shown in FIG. 11.

The first two cells specify the UE and the bearer the parameters listed in the record belong to. In case of LTE the UE ID may be the MME UE S1AP ID, which uniquely identify the UE association over the S1 interface within the MME (see 3GPP TS 23.401 V9.3.0 (2010.06), 'S1 Application Protocol (S1AP)', Release 9). The ID is the same as long as MME-relocation is not performed. In case of 2G/3G the terminal IMSI may be used.

Since the cache terminates each tunnel and starts a new tunnel in a certain direction this means that there are two IP/tunnel identifiers in both directions. These are shown in the next four records of the mapping table. Here S-IP and R-IP represent the IP addresses of the uplink (SGW) and downlink tunnel endpoints (eNodeB or RNC), respectively, while TEID-Up and TEID-Dn represent the identifiers of the corresponding tunnels. Note that there should not be as many different tunnel endpoint IP addresses as many different TEIDs. However, the tuple IP/TEID uniquely defines a tunnel to a certain direction, and each tunnel uniquely identifies a bearer. If the traffic is not served from cache then it is forwarded according to these entries.

The next entry lists the identifiers of all flows being handled by the local cache. This is needed for properly handling session continuity in case of mobility as will be described later.

The last two entries list the identifiers of all flows started and therefore anchored to a remote cache and the reachability for the given cache (IP address and possibly tunnel.

The forwarding decision in a cache is that uplink packets to all flows listed here should be forwarded to the corresponding cache and not to the SGW.

Mobility handling will now be discussed.

The terminal (UE) mobility is handled in a different way when the terminal moves within the area 'covered' by a Cache or moves away from its area.

The idea is again that the RBS is sending the required information about the tunnel changes to the cache it connects to on control level.

There may be a few different types of handover described by different processes. For example, S1-based handover and X2-based handovers (see 3GPP TS 23.401) differ significantly. The common point, however, is that at a certain stage the target eNodeB will be aware of the (potentially modified) downlink tunnel parameters from SGW, and also of the completion of the handover. At this point it will be able to communicate the changed tunnel information to the cache.

Figure 9:
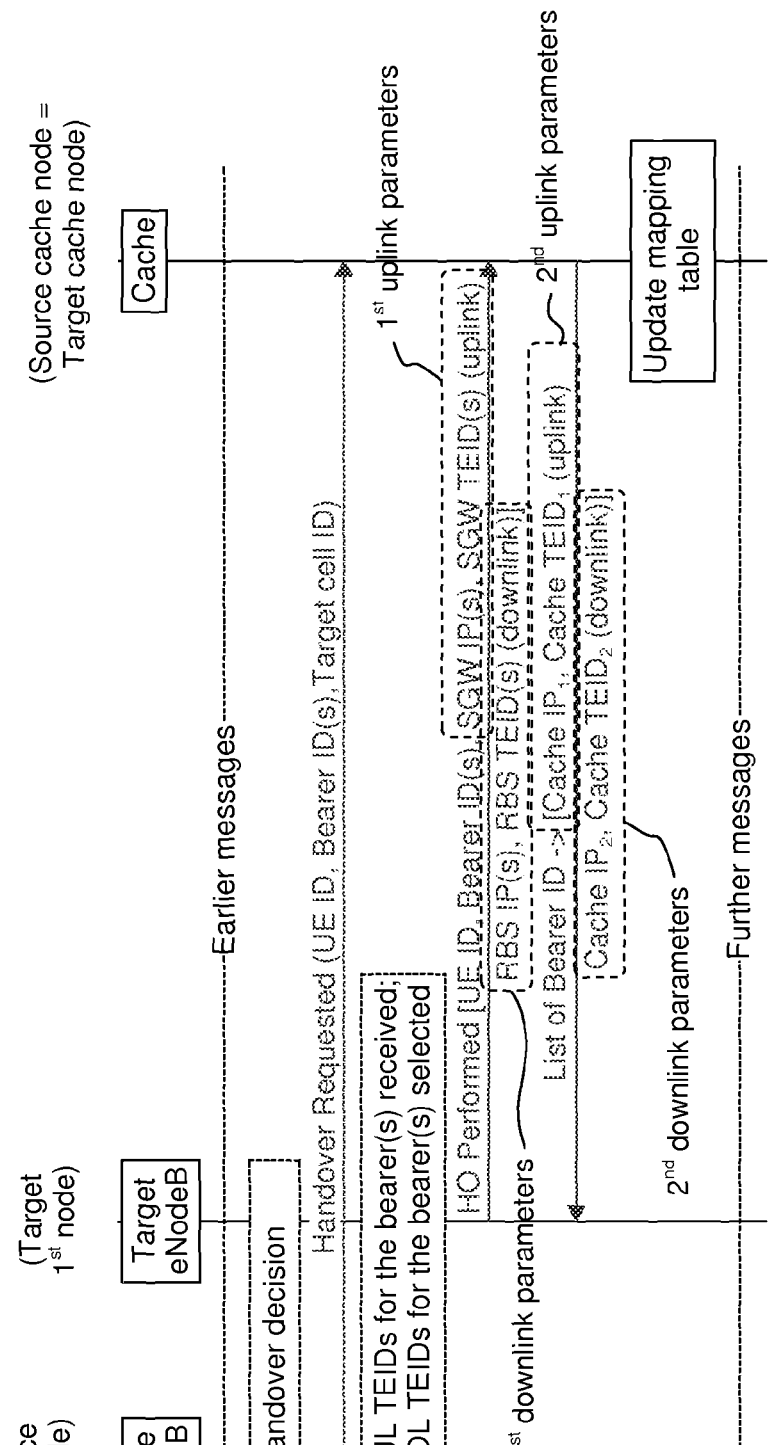
FIG. 9 illustrates a LTE handover procedure according to an embodiment of the present invention including mapping table update (source and target eNodeB rendered to the same cache)

An example of the signaling exchange for tunnel update during mobility when the terminal remains within the coverage area of a cache entity is shown in FIG. 9. Note that the dashed arrow represents an optional signaling step from the source eNodeB (that happens before the signaling from the target eNodeB). The reason for this signaling is to help identifying the UE and bearers for which the tunnel information has changed, and is most useful in case of more complicated handover cases like handovers with cache of cache entity or Inter Radio Access Technology (IRAT) handovers.

When the target eNodeB is connected on control plane to another cache entity, then it can only communicate to that cache, and it has to also be secured that if there are ongoing flows from the previous cache those will still be served seamlessly. This is achieved in the following way (see FIG. 10):

- The target eNodeB communicates the identity of the UE and bearers to the target cache as well as the identity of the source eNodeB (the E-UTRAN Cell Global Identifier (ECGI) may e.g. be a proper parameter for that, and this is conveyed to the target eNodeB during the handover preparation process)
- The target cache has a pre-configured mapping information for the different eNodeB (ECGI)—cache relations so it can select the source cache the source eNodeB is connected to.
- The target cache connects the source cache asking for potential ongoing flows for the given UE served by the cache
- The source cache replies with a list of ongoing flows. If there are such flows, at this point the source cache knows that these flows should be forwarded to the target cache in downlink direction, thus it replaces the downlink tunnel information for the corresponding bearers with the tunnel information of the target cache
- The target cache updates its local database with the new bearer and tunnel information. Besides, if the list received from the source cache was not empty, then it stores the list of flows in the last record for the given bearer, and it also registers the identity of the corresponding source cache entity in the previous record. This will secure that the packets for this flows will be uplink forwarded to the source cache. New flows, however, will be forwarded, as normally, either to the SGW (cache miss) or to the local cache. There may also be local timers implemented that make sure that after these flows are terminated (no packets received for a given period) the corresponding entries are removed.

The main advantage of the invention is the applicability of caching in 3GPP networks below the IP point of presence without having any interface with the core network nodes. Connectivity to the caches and session continuity is secured both for static and moving subscribers.

A more general summary of the above-described methods, procedures and apparatus embodying the present invention will now be described with reference to FIGS. 12 to 14.

FIG. 12 is a schematic flowchart illustrating a method of introducing user plane caching over an interface between a first node in a radio access network and a second node in a core network. The steps of FIG. 12 correspond generally to those in FIGS. 7 and 8. The first node of FIG. 12 corresponds to the eNodeB of FIGS. 7 and 8, while the second node of FIG. 12 corresponds to the Serving GW of FIGS. 7 and 8. The cache node of FIG. 12 corresponds to the cache of FIGS. 7 and 8, while the intermediate node of FIG. 12 corresponds to the MME of FIGS. 7 and 8. In order further to clarify the correspondence between FIG. 12 and the earlier-described FIGS. 7 and 8, the tunnel parameters described below with reference to FIG. 12 are also marked on FIGS. 7 and 8.

Referring to FIG. 12, in step S1 the first node receives first uplink tunnel parameters relating to the second node. In step S2, the first node selects first downlink tunnel parameters relating to the first node. In steps S3 and S4, the first node sends the first uplink and downlink tunnel parameters respectively to a cache node designated to the first node (these may be sent in a single message or separate messages; if sent in separate messages as illustrated, the order may be reversed). In steps S5 and S6, the first node receives second uplink and downlink tunnel parameters respectively relating to the cache node (these may be received in a single message or separate messages; if received in separate messages as illustrated, the order may be reversed). In step S7, the first node sends the second downlink tunnel parameters to the second node. This enables establishment of a second tunnel between the cache node and the second node based on the first uplink tunnel parameters and the second downlink tunnel parameters. In step S8, the first node establishes a first tunnel between the first node and the cache node based on the second uplink tunnel parameters and the first downlink tunnel parameters. In step S9, the first node sends uplink user plane data to the second node through the first and second tunnels via the cache node. In step S10, the first node receives downlink user plane data from the second node through the second and first tunnels via the cache node. This enables user plane data between the first and second nodes to be cached at the cache node.

Figure 13:
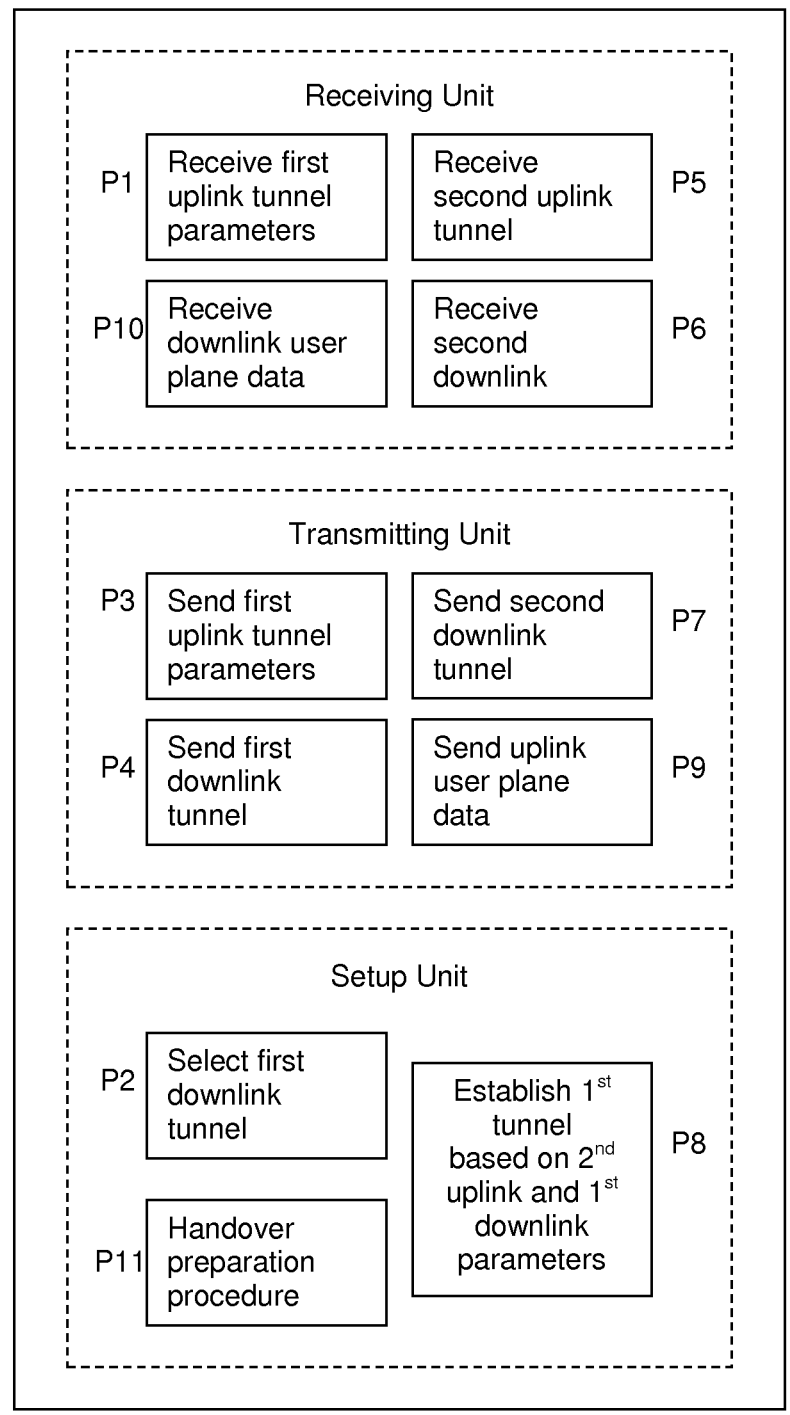
FIG. 13 is a schematic illustration of apparatus for performing the methods of FIGS. 12 and 14.

FIG. 13 is a schematic block diagram illustrating apparatus for use to perform the method carried out by the first node of FIG. 12. For each of the functional blocks of FIG. 12, there is a corresponding unit illustrated in FIG. 13 for performing the function represented by that functional block; like reference numerals have been applied, so that for example unit P1 is provided for performing the function of step S1.

More specifically, the apparatus comprises means (or a component or processor or unit) P1 for receiving first uplink tunnel parameters relating to the second node. The apparatus comprises means (or a component or processor or unit) P2 for selecting first downlink tunnel parameters relating to the first node. The apparatus comprises means (or a component or processor or unit) P3 and P4 for sending the first uplink and downlink tunnel parameters to a cache node designated to the first node. The apparatus comprises means (or a component or processor or unit) P5 and P6 for receiving second uplink and downlink tunnel parameters relating to the cache node. The apparatus comprises means (or a component or processor or unit) P7 for sending the second downlink tunnel parameters to the second node. These enable establishment of a second tunnel between the cache node and the second node based on the first uplink tunnel parameters and the second downlink tunnel parameters. The apparatus comprises means (or a component or processor or unit) P8 for establishing a first tunnel between the first node and the cache node based on the second uplink tunnel parameters and the first downlink tunnel parameters. The apparatus comprises means (or a component or processor or unit) P9 for sending uplink user plane data to the second node through the first and second tunnels via the cache node. The apparatus comprises means (or a component or processor or unit) P10 for receiving downlink user plane data from the second node through the second and first tunnels via the cache node. These enable user plane data between the first and second nodes to be cached at the cache node. The units P1, P5, P6 and P10 can be considered to form part of a receiving unit for the apparatus. The units P3, P4, P7 and P9 can be considered to form part of a transmitting or sending unit for the apparatus. The units P2 and P8 can be considered to form part of a setup unit for the apparatus. Unit P11 will be explained with reference to FIG. 14.

The tunnel parameters may comprise an IP address and a tunnel endpoint identifier. The method may comprise sending, and the apparatus may comprise means for sending, a user terminal identity and bearer identity associated with the user plane with the first uplink and downlink tunnel parameters sent to the cache node.

The method may comprise receiving, and the apparatus may comprise means for receiving, the first uplink tunnel parameters from the second node via an intermediate node and sending the second downlink tunnel parameters to the second node via the or another intermediate node.

The method may comprise receiving, and the apparatus may comprise means for receiving, the first uplink tunnel parameters from the second node in a context or bearer setup request, and sending the second downlink tunnel parameters to the second node in a context or bearer setup response.

The method may comprise receiving, and the apparatus may comprise means for receiving, the first uplink tunnel parameters from the second node.

The method may comprise receiving, and the apparatus may comprise means for receiving, the second uplink and downlink tunnel parameters from the cache node.

The cache node may be designated to a plurality of such first nodes.

The cache node may be located in the radio access network.

Figure 10:
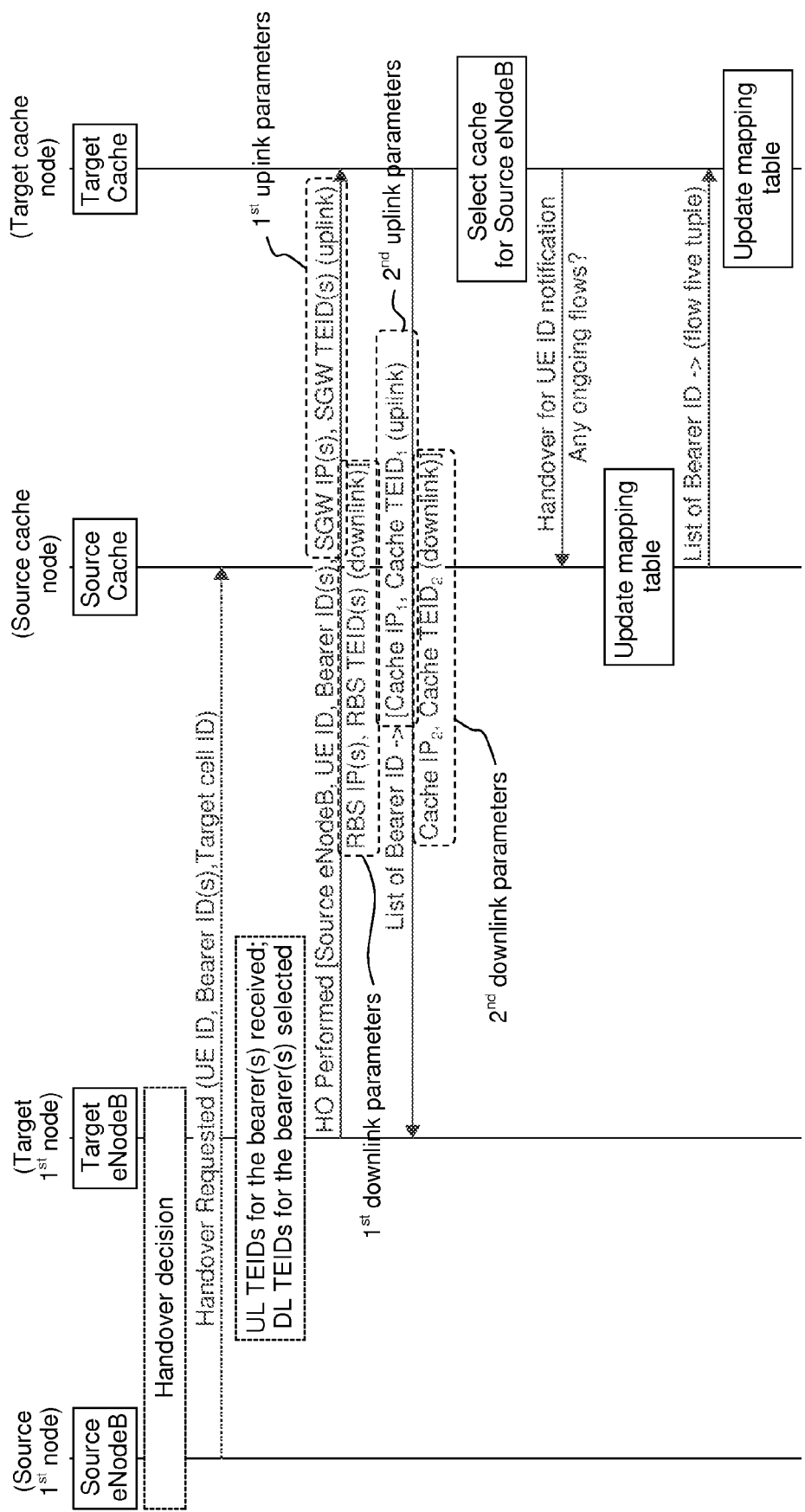
FIG. 10 illustrates a LTE handover procedure according to an embodiment of the present invention including mapping table update (source and target eNodeB belonging to different caches)

FIG. 14 is a schematic flowchart illustrating a method of handing over an existing connection, established using a method of FIG. 12, from a source first node to a target first node, where a source cache node is designated to the source first node and a target cache node is designated to the target first node, the source cache node being the same as or different to the target cache node. The steps of FIG. 14 correspond generally those in FIGS. 9 and 10. The correspondence between the nodes of FIG. 14 and the nodes of FIGS. 9 and 10 is noted in FIGS. 9 and 10. In order further to clarify the correspondence between FIG. 14 and the earlier-described FIGS. 9 and 10, the tunnel parameters described below with reference to FIG. 14 are also marked on FIGS. 9 and 10.

The handover method of FIG. 14 comprises, at the target first node and following a handover preparation process in step T11 involving the source first node and the target first node: sending the first uplink parameters for the existing connection and first downlink parameters relating to the target first node to the target cache node in steps T3 and T4 respectively (these may be sent in a single message or separate messages; if sent in separate messages as illustrated, the order may be reversed), receiving second uplink and downlink parameters relating to the target cache node from the target cache node in steps T5 and T6 respectively (these may be sent in a single message or separate messages; if received in separate messages as illustrated, the order may be reversed), and establishing a first tunnel between the target first node and the target cache in step T8 based on the second uplink tunnel parameters and the first downlink tunnel parameters, the first tunnel being for ongoing and new data flows between the first and second nodes over the handed-over connection.

The schematic block diagram of FIG. 13 also includes units for use in performing the method carried out by the target first node of FIG. 14. For each of the functional blocks of FIG. 14, there is a corresponding unit illustrated in FIG. 13 for performing the function represented by that functional block; like reference numerals have been applied, so that for example unit P3 is provided for performing the function of step T3. The setup unit in the apparatus of FIG. 13 comprises means (or a component or processor or unit) P11 for performing the handover preparation process.

The method may comprise sending T7, and the apparatus may comprise means P7 for sending, the second downlink tunnel parameters from the target first node to the second node, and establishing or at least thereby enabling establishment of a second tunnel between the target cache node and the second node based on the first uplink tunnel parameters and the second downlink tunnel parameters, the second tunnel being at least for new data flows between the first and second nodes over the handed-over connection.

The method may comprise, at the target cache node and if the target cache node is different to the source cache node, communicating with the source cache node to determine whether there are any ongoing data flows between the first and second nodes over the connection, and if so then arranging for those ongoing flows to be uplink forwarded from the target cache node to the second node via the source cache node.

The first node of FIGS. 12 to 14 may be or comprise an eNodeB, RBS, RNC or SGSN.

The second node of FIGS. 12 to 14 may be or comprise a SGW or SGSN.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. Any appended claims now or in future are to be interpreted as covering an operating program by itself, or as a record on a carrier, or as a signal, or in any other form.

FIG. 15 is a schematic illustration of a node 1 in which a method embodying the present invention can be implemented. A computer program for controlling the node 1 to carry out a method embodying the present invention is stored in a program storage 30. Data used during the performance of a method embodying the present invention is stored in a data storage 20. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present invention as defined by the appended claims.

The invention claimed is:

1. An apparatus in a radio access network, the apparatus comprising:
    means for receiving first uplink tunnel parameters relating to a serving gateway node in a core network,
    means for selecting first downlink tunnel parameters relating to a first node, means for sending the first uplink and downlink tunnel parameters to a cache node designated to the first node, means for receiving second uplink and downlink tunnel parameters relating to the cache node, means for sending the second downlink tunnel parameters to the serving gateway node, enabling establishment of a second tunnel between the cache node and the serving gateway node based on the first uplink tunnel parameters and the second downlink tunnel parameters, means for establishing a first tunnel between the first node and the cache node based on the second uplink tunnel parameters and the first downlink tunnel parameters, means for sending uplink user plane data to the serving gateway node through the first and second tunnels via the cache node, and means for receiving downlink user plane data from the serving gateway node through the second and first tunnels via the cache node, enabling the user plane data transmitted between the first node and the serving gateway node to be cached at the cache node.

2. The apparatus as claimed in claim 1, wherein the tunnel parameters comprise an IP address and a tunnel endpoint identifier.

3. The apparatus as claimed in claim 1, further comprising means for sending a user terminal identity and bearer identity associated with the user plane with the first uplink and downlink tunnel parameters sent to the cache node.

4. The apparatus as claimed in claim 1, further comprising means for receiving the first uplink tunnel parameters from the serving gateway node via an intermediate node and means for sending the second downlink tunnel parameters to the serving gateway node via the or another intermediate node.

5. The apparatus as claimed in claim 1, further comprising means for receiving the first uplink tunnel parameters from the serving gateway node in a context or bearer setup request, and means for sending the second downlink tunnel parameters to the serving gateway node in a context or bearer setup response.

6. The apparatus as claimed in claim 1, further comprising means for receiving the first uplink tunnel parameters from the serving gateway node.

7. The apparatus as claimed in claim 1, further comprising means for receiving the second uplink and downlink tunnel parameters from the cache node.

8. The apparatus as claimed in claim 1, wherein the cache node is designated to a plurality of first nodes.

9. The apparatus as claimed in claim 1, wherein the cache node is located in the radio access network.

10. The apparatus as claimed in claim 1, wherein the first node is or comprises an eNodeB, RBS, RNC or SGSN.

11. The apparatus as claimed claim 1, wherein the serving gateway node is or comprises a SGW or SGSN.

12. A method of introducing user plane caching over an interface between a first node in a radio access network and a serving gateway node in a core network, the method comprising, at the first node:

receiving first uplink tunnel parameters relating to the serving gateway node, selecting first downlink tunnel parameters relating to the first node, sending the first uplink and downlink tunnel parameters to a cache node designated to the first node, receiving second uplink and downlink tunnel parameters relating to the cache node, sending the second downlink tunnel parameters to the serving gateway node, enabling establishment of a second tunnel between the cache node and the serving gateway node based on the first uplink tunnel parameters and the second downlink tunnel parameters, establishing a first tunnel between the first node and the cache node based on the second uplink tunnel parameters and the first downlink tunnel parameters, sending uplink user plane data to the serving gateway node through the first and second tunnels via the cache node, and receiving downlink user plane data from the serving gateway node through the second and first tunnels via the cache node, enabling the user plane data transmitted between the first node and the serving gateway node to be cached at the cache node.

13. The method as claimed in claim 12 of handing over an existing connection established from the first node, being a source first node, to a target first node, where the cache node, being a source cache node, is designated to the source first node and a target cache node is designated to the target first node, the source cache node being the same as or different from the target cache node, and the method further comprising, at the target first node and being carried out following a handover preparation process involving the source first node and the target first node:

sending the first uplink parameters for the existing connection and third downlink parameters relating to the target first node to the target cache node, receiving fourth uplink and downlink parameters relating to the target cache node from the target cache node, and establishing a third tunnel between the target first node and the target cache node based on the fourth uplink tunnel parameters and the third downlink tunnel parameters, the third tunnel being for ongoing and new data flows between the target first node and the serving gateway node over the handed-over connection.

14. The method as claimed in claim 13, further comprising sending the fourth downlink tunnel parameters from the target first node to the serving gateway node, and establishing or at least thereby enabling establishment of a fourth tunnel between the target cache node and the serving gateway node based on the first uplink tunnel parameters and the third downlink tunnel parameters, the fourth tunnel being at least for new data flows between the target first node and the serving gateway node over the handed-over connection.

15. The method as claimed in claim 13, further comprising, at the target cache node and based on the target cache node being different than the source cache node, communicating with the source cache node to determine whether there are any ongoing data flows between the source first node and the serving gateway node over the handed-over connection, and based on there being at least one ongoing data flow, then arranging for the at least one ongoing data flow to be uplink forwarded from the target cache node to the serving gateway node via the source cache node.

16. A non-transitory storage medium containing a program comprising computer executable instructions, which when executed by a computer, cause the computer to perform the method of claim 12.

* * * * *